(12) United States Patent
Hauke

(10) Patent No.: US 8,077,930 B2
(45) Date of Patent: Dec. 13, 2011

(54) METHOD FOR RECOGNIZING CONTENT IN AN IMAGE SEQUENCE

(75) Inventor: Rudolf Hauke, Niederstotzingen (DE)

(73) Assignee: ATG Advanced Swiss Technology Group AG, Pfaeffikon (CH)

( * ) Notice: Subject to any disclaimer, the term of this patent is extended or adjusted under 35 U.S.C. 154(b) by 984 days.

(21) Appl. No.: 11/785,027

(22) Filed: Apr. 13, 2007

(65) Prior Publication Data

US 2008/0253623 A1    Oct. 16, 2008

(51) Int. Cl.
*G06K 9/00* (2006.01)
*G06K 9/46* (2006.01)
*G06K 9/60* (2006.01)

(52) U.S. Cl. ......... 382/115; 382/118; 382/190; 382/305

(58) Field of Classification Search .......... 382/115, 382/118, 190, 305
See application file for complete search history.

(56) References Cited

U.S. PATENT DOCUMENTS

| | | | |
|---|---|---|---|
| 6,256,400 B1* | 7/2001 | Takata et al. | 382/103 |
| 6,711,587 B1* | 3/2004 | Dufaux | 1/1 |
| 6,925,197 B2* | 8/2005 | Dimitrova et al. | 382/118 |
| 7,489,804 B2* | 2/2009 | Kontsevich | 382/103 |
| 7,564,476 B1* | 7/2009 | Coughlan et al. | 348/14.08 |
| 2007/0050406 A1* | 3/2007 | Byers | 707/104.1 |
| 2007/0294295 A1* | 12/2007 | Finkelstein et al. | 707/104.1 |
| 2008/0159622 A1* | 7/2008 | Agnihotri et al. | 382/157 |
| 2008/0159708 A1* | 7/2008 | Kazama et al. | 386/69 |

FOREIGN PATENT DOCUMENTS

| | | |
|---|---|---|
| WO | WO 97/40454 A1 | 10/1997 |
| WO | WO 97/44757 A2 | 11/1997 |
| WO | WO 2007/036892 A1 | 4/2007 |

OTHER PUBLICATIONS

Jaffre et al. 'Costume: A New Feature for Automatic Video Content Indexing' In Proc. RIAO, 2004.*
Everingham et al. '"Hello! My name is . . . Buffy" —Automatic Naming of Characters in TV Video' in BMVC, 2006.*
Snoek et al. 'Multimodal Video Indexing: A Review of the State-of-the-art' Multimedia Tools and Applications, vol. 25 No. 1, Jan. 1, 2005, pp. 5-35.*

(Continued)

*Primary Examiner* — Brian Werner
*Assistant Examiner* — Utpal Shah
(74) *Attorney, Agent, or Firm* — Muncy, Geissler, Olds & Lowe, PLLC

(57) ABSTRACT

A method for recognizing content in an image sequence is provided, the method includes the steps of: detecting at least one face appearing in at least one frame of an image sequence under test; recognizing characteristic features of the at least one face; comparing the characteristic features to known features of characters stored in a database, thereby deciding whether the face represents a known character; detecting and recognizing at least one additional feature in at least one frame of the image sequence under test and at least one relation between the appearance of the known character and the at least one additional feature; and comparing the at least one relation to metadata comprising known relations stored in the database each one assigned to a particular known image sequence, thereby recognizing if the image sequence under test at least partially equals one of the known image sequences.

33 Claims, 3 Drawing Sheets

OTHER PUBLICATIONS

Day et al. "Spatio-Temporal Modeling of Video Data for On-line Object Oriented Query Processing" Proceedings of IMCS, 1995, pp. 98-105.*

Ying Li et al: "Movie Content Analysis, Indexing and Skimming via Multimodal Information", Kluwer Academic Publishers, Jan. 1, 2003, pp. 123-154.

Arandjelovic Ognjen et al: "Automatic Face Recognition for Film Character Retrieval in Feature-Length Films", IEEE Computer Society Conference on San Diego, Jun. 20, 2005, vol. 1, pp. 860-867.

Satoh S et al: "Name-It: Naming and Detecting Faces in News Videos", IEEE Multimedia, IEEE Service Center, vol. 6, No. 1, Jan. 1, 1999, pp. 22-35.

Zhai Y et al: "Semantic classification of movie scenes using finite state machines", Recent advances in Image and Video Retrieval, IEE Proceedings: Vision, Image and Signal Processing, Institution of Electrical Engineers, vol. 152, No. 6, Dec. 9, 2005, pp. 896-901.

* cited by examiner

METHOD FOR RECOGNIZING CONTENT IN AN IMAGE SEQUENCE

BACKGROUND OF THE INVENTION

1. Field of the Invention

The present invention relates to a method for recognizing content in image sequences.

2. Description of the Background Art

With an increase of traffic on video sharing websites there is a growing demand for techniques to classify an image sequence in order to give the flood of information a structure for easing its use and searchability. On the other hand providers of such video sharing websites are under increasing pressure on the part of copyright holders to make sure their copyrights are not violated by distribution of copyrighted video footage. Framewise comparison of the image sequence that users want to upload is impracticable because of the huge amount of calculating power and memory necessary. Furthermore the provider would have to own a copy of every copyrighted movie. An approach for achieving the object needs to extract metadata describing the image sequence and comparing them to sets of metadata assigned to individual movies stored in a database thus tremendously reducing the necessary memory. Such an approach has been recently described by Mark Everingham, Josef Sivic and Andrew Zisserman, Department of Engineering Science, University of Oxford, in "Hello! My name is . . . Buffy"—Automatic Naming of Characters in TV Video. In this publication a method for automatically labelling appearances of characters in TV or film material is presented, which combines multiple sources of information: (i) automatic generation of time stamped character annotation by aligning subtitles and transcripts; (ii) strengthening the supervisory information by identifying when characters are speaking; and (iii) using complementary cues of face matching and clothing matching to propose common annotations for face tracks.

The drawback of this approach is that subtitles are available only in image sequences on DVDs and that these subtitles can easily be removed thus making content recognition impossible. Transcripts are normally not publicly available but for a fraction of all copyrighted videos and need to be tediously collected from a huge number of sources distributed over the internet. This approach may consequently ease content based search within a video but is less adequate for preventing copyright violations.

SUMMARY OF THE INVENTION

It is therefore an object of the present invention to provide an improved method for recognizing content in an image sequence.

With the foregoing and other objects in view there is provided, in accordance with the invention, a method for recognizing content in an image sequence having at least one frame, comprising the steps of: detecting at least one face appearing in at least one of the frames of a image sequence under test; recognizing characteristic features of the at least one face; comparing the characteristic features to known features of characters stored in a database, thereby deciding whether the face represents a known character; detecting and recognizing at least one additional feature in at least one frame of the image sequence under test and at least one relation between the appearance of the known character and the at least one additional feature; comparing the at least one relation to metadata comprising known relations stored in the database each one assigned to a particular known image sequence, thereby recognizing if the image sequence under test at least partially equals one of the known image sequences.

In other words, according to the invention, an image sequence under test having at least one frame or a sequence of frames is analyzed using a face detection technique for detecting at least one face in at least one of the frames. The term image sequence may denote any type of electronic image documents. In this sense the term image sequence may apply to sequences of images, such as videos or image sequences from computer games or to single images as a borderline case of an image sequence with the length 1. If a face is detected in the frame, recognition of characteristic features, i.e. biometrical features, of that face is attempted. If these characteristic features are acquired they are compared to known features of characters stored in a database. If the characteristic features match a set of known features the character is identified as a known character. Such a character can be a real person, such as an actor or an actress. Likewise it can be an animated character, e.g. in an animated cartoon or a computer game. The database can contain information assigned to that known character describing in which known image sequences, e.g. Hollywood movies, this known character is starring, thereby tremendously reducing the number of datasets in the database to be considered in the subsequent search. The image sequence under test is furthermore scanned for at least one additional feature appearing in at least one frame. The additional feature can be an attribute of the character himself. Preferably it is an object or another character appearing in one of the frames. In the latter case a relation between the appearance of the identified known character and the additional feature, a spatio-temporal relation, to be more specific, is obtained by locating the identified known character and the additional feature, i.e. determining their respective position in their respective frame, and by determining a time interval between their appearance, which can be zero if they appear in the same frame. In conventional 2D frames the depth dimension is also zero, however 3D image sequences are not excluded from being analyzed by the method. This spatiotemporal relation is compared to metadata stored in the database comprising known spatiotemporal relations between the known character and additional features each spatiotemporal relation assigned to a particular known image sequence, the known character is starring in. Thus it is recognized if the image sequence under test at least partially equals one of the known image sequences. This way it is possible to figure out if the image sequence under test is a sequence out of one of the known image sequences, e.g. to detect if the image sequence under test is copyrighted without relying on hidden markers, digital signatures, check sums or other auxiliary means that can easily be faked or removed, e.g. by projecting a movie and recording the projected images by means of a camera, e.g. a video camera, a webcam, a camera integrated into a cellular phone or the like. Another possible application of the method is to recognize content of computer games by analyzing their screen output, which is in the form of a video stream. Illegal or undesirable playing of such games can be detected and appropriate measures can be taken, e.g. informing an administrator or an authority, killing the game application or shutting down the computer or device which the game is played on. For instance, children can be kept from playing first person shooters, third person shooters or other computer or video fighting games on PCs, portable devices, video game consoles for home or casino use, handheld devices, cellular phones and the like.

The spatiotemporal relation between faces and objects towards each other can be scalable in order to be independent from the resolution of the frames.

According to another aspect of the invention, the additional feature can be another face. This other face can be detected and recognized the same way. If two or more characters are recognized, the further search reduces to sets of metadata in the database assigned to known image sequence in which the characters co-appear. Regarding the spatiotemporal relation between the appearance of the two or more characters the sets of metadata to be considered is further reduced. For example, if one of the identified characters is Sean Connery and another one is Ursula Andress and they co-appear in the same frame the probability is high that the image sequence under test is a sequence of the James Bond movie "Dr. No", further confirmed by their spatiotemporal relation, i.e. their relative position towards each other in the frame. Two or more characters in different frames with a certain time interval between their appearances can also be used to identify the image sequence under test. Thereby the sheer appearance of the faces can be regarded without considering the absolute or relative position of the faces. Taking the relative position into account as well further increases the discriminatory power of the method.

According to yet another aspect of the invention, the at least one additional feature can be an object, for example, in one of the classes: car, weapon, building, text, logo, trademark. Such objects may be recognized and classified using pattern matching techniques applied for identification of biometric features in huge data bases. Reference objects for each class are also stored in the database. These reference objects can be images or 3D models of objects, from which 2D projections can easily be derived in order to recognize an object in the image sequence under test regardless of its orientation. Since the number of possible 2D projections of a 3D model is infinite these projections do not necessarily have to be all stored in the database. Instead they can be generated on demand from the 3D model. Practical approaches work with just a few projections (12 to 24) which can be stored in the data base or generated on demand. These approaches also allow for a recognition independent of the orientation of the objects. 3D modeling can also be applied to characters or faces. For instance, the co-appearance of Sean Connery with an object identified as a car of recognized make, such as an Aston Martin, along with the spatiotemporal relation between their appearances can allow a unambiguous assignment of the image sequence under test. The discriminatory power of the method increases with the number of faces and objects incorporated in the comparison. This applies for faces and objects appearing in one single frame as well as in different frames. Two or more characters or objects adjacent to each other in a frame can be combined to form an object class and tracked together as such. Characteristic features of animated faces appearing in computer games, e.g. computer or video fighting games, such as Counterstrike or Doom, can be recognized as well and lead to an adequate action like terminating the game application or informing an administrator or an authority. The discriminatory power of the method is particularly high if weapons co-appearing with these animated faces are recognized.

A text object appearing in the image sequence can be either recognized by an OCR (optical character recognition) technique, which recognizes every single alphabetical character as well as by pattern matching, where a whole word is recognized by pattern matching or correlation, which is much faster than OCR. Therefore a reference list of words can be stored in the database. Such a list can also be used to detect offensive language in images and frames. In case an offensive word is recognized further action can be taken such as to block displaying, downloading or uploading an image, inform an administrator or an authority or the like. Texts to be recognized can include characters of any script, such as Hebrew, Cyrillic, Chinese, Japanese, Latin etc.

In accordance with an embodiment of the invention, the additional feature can be the color of an object. It also can be an object touched by the known character, such as a glass of wine or a handgun held by the character. In another preferred embodiment the additional feature is a costume worn by the known character. A background scenery, e.g. sea, mountains, indoor etc., can also be classified as an additional feature.

According to another embodiment of the invention, the additional feature can be a verbal or nonverbal sound, such as engine noise or speech. The type of noise may be detected by spectral analysis, speech recognition techniques or the like. The appearance of a certain character and his recognized speech may also allow a unambiguous assignment of the image sequence under test to a specific known image sequence. However speech is often translated into a plurality of languages whereas image sequences always remain the same.

Other additional features that can be considered are facial expressions, hand gestures or body movements of the known character.

In an embodiment of the invention the additional feature is a spatiotemporal profile of the known character acquired by tracking the known character in the course of the image sequence under test. Such a spatiotemporal profile can describe sequences of frames in which one of the characters or objects appears in the image sequence under test. Information on the position of the character or object with respect to the frame are not mandatory but can increase the performance of the method. Thus time maps can be created describing the appearance of characters and objects or other additional features in the course of the image sequence under test which can be compared to time maps contained in the metadata in the database. This comparison can be carried out as well for fractions of the time maps in order to be able to identify short image sequences cut out of larger video footage.

The position of a face or an object can be described in the form of coordinates (Cartesian, Polar coordinates or the like). Since conventional frames are 2D projections of 3D objects and settings, two coordinates will be sufficient in most cases. However the terms image sequence and frame may as well refer to 3D images such as holograms. In this case three coordinates are needed to describe the position. Beside the coordinates the description of a face or another object comprises an object classifier and a time stamp, if applicable, whereby time is considered the fourth dimension.

According to an aspect of the invention, the effort for recognizing content in the image sequence under test can be further reduced by subsampling. The conventional frame rate in movies represented in movie theaters is 24 frames per second. Subsampling means that only a fraction of this number is regarded for content recognition. For instance with a subsampling frame rate of 2.4 frames per second every tenth frame is used for the method thus further reducing the effort. Time sequence interpolation in most cases will be good enough for tracking normal moving characters or objects.

The method can be used for generating a cast list of the image sequence under test or for identifying a movie title by comparing that cast list to a data base.

The method may be advantageously applied for detecting copyrighted image sequences. The detection may be carried out on a client computer following an attempt to upload the image sequence under test from that client computer to a server, which may host a video sharing website. If the image sequence under test is recognized as copyrighted the upload can be denied. The method may as well be carried out on a server following an upload of the image sequence under test from the client computer. If the image sequence under test is recognized as non copyrighted the image sequence under test is incorporated in a video database. Otherwise it is rejected.

The method may also be used to scan a database, such as the internet, for similar image sequences or images. A single image shall be considered a borderline case of an image sequence having only one frame in which the at least one character appears along with the additional feature.

The method can be implemented on any type of data processing facilities, such as personal computers, servers, portable computers, other portable units such as handheld computers or cell phones. The frames can be acquired from a file stored on the data processing facility or from a frame buffer of a graphics device, such as a graphics card arranged in the data processing facility. This method has been described in the patent application U.S. Ser. No. 11/421,892 which is hereby incorporated by reference.

The database can be built using a similar method comprising the steps of detecting at least one face appearing in at least one of the frames of an image sequence under test; recognizing characteristic features of the at least one face; storing the characteristic features in a database and assigning them to a known character; detecting and recognizing at least one additional feature in at least one frame of the image sequence under test and at least one relation between the appearance of the known character and the at least one additional feature; storing the at least one relation to metadata in the database; assigning the at least one relation to the image sequence under test in the database. All features described in the embodiments above can be applied for building the database in a similar manner.

It should be emphasized that all features described above and in the appended claims can be combined with each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
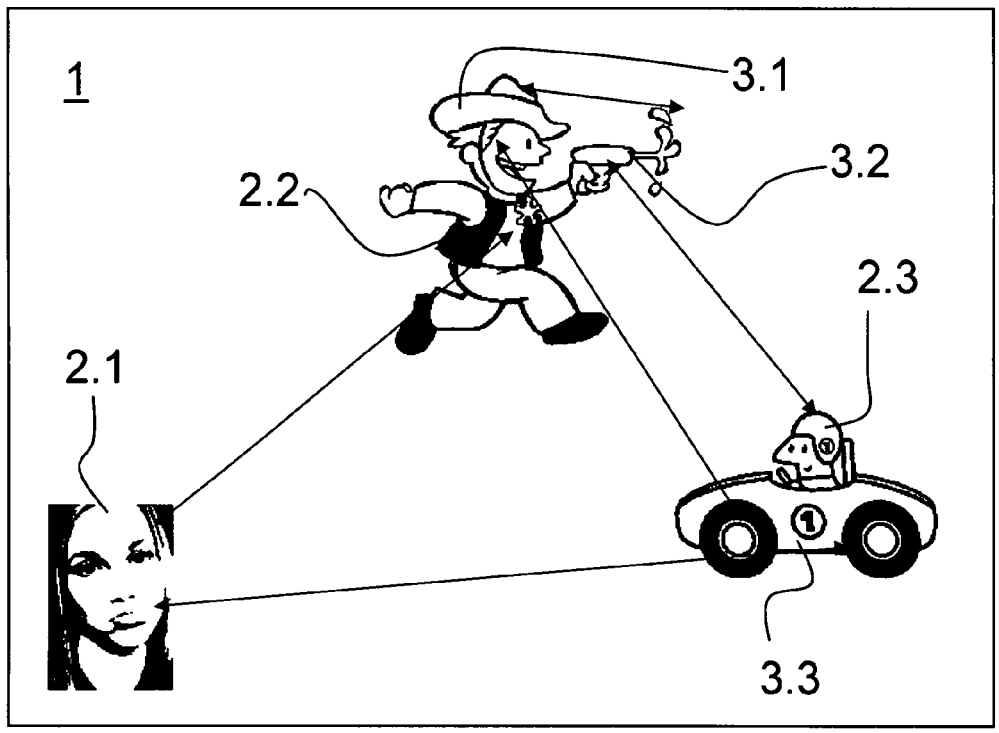
FIG. 1 is a schematic view of an image frame with faces and objects identified by a method according to the invention.

Referring to the figures of the drawings in detail and first, particularly, to FIG. 1 thereof, there is shown a schematic view of an image frame 1 with three faces 2.1 to 2.3 and three objects 3.1 to 3.3 identified by a method according to the invention. The frame can be part of an image sequence, such as a video or an image stream from the video output of a computer game. It can be as well a single image. In a first step of the method, the faces 2.1 to 2.3 appearing in the frame 1 are detected. Then a recognition of characteristic features, e.g. biometrical features, is attempted for each face 2.1 to 2.3. These biometrical features are then compared to known features of characters stored in a database, thereby deciding whether the face 2.1 to 2.3 represents a known character. If this comparison is successful and the characters are identified, the database can be checked for metadata of known image sequences in which these characters co-appear. If the result is ambiguous, at least one of the objects 3.1 to 3.3 (e.g. hat, gun, car) can be recognized and classified by comparison to reference objects stored in the database and checking their appearance with the characters 2.1 to 2.3 in the same frame of an image sequence. Furthermore the positions of faces 2.1 to 2.3 and objects 3.1 to 3.3 relative to each other indicated by arrows can be acquired and compared to metadata in the database, provided these metadata comprise such relative positions from characters and objects of known images or image sequences. Comparing identified characters and classified objects along with their respective positions to each other yields a high discriminatory power so chances are good to recognize if the frame is part of an image sequence stored in the database. This way it can be easily checked, if the content of the image is copyrighted, illegal or undesirable and appropriate measures can be taken. The faces 2.1 to 2.3 can be faces of real characters like face 2.1 or faces of animated characters like faces 2.2 and 2.3. The number of faces 2.1 to 2.3 and objects 3.1 to 3.3 recognized in the frame 1 can be different from three.

Figure 2:
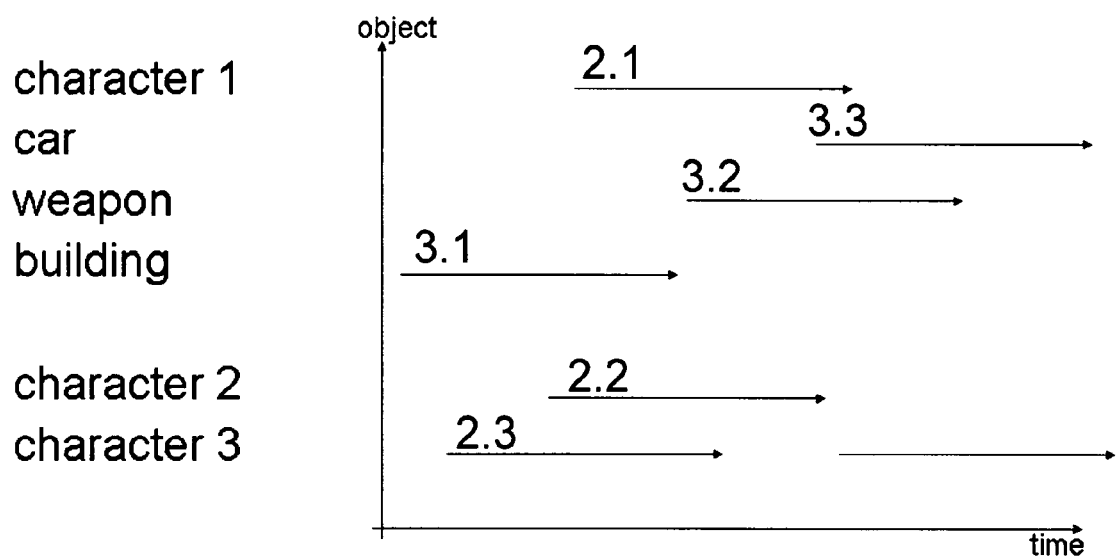
FIG. 2 is a diagram depicting the successive appearance of characters and objects in an image sequence.

FIG. 2 shows a diagram depicting the successive appearance of characters 2.1 to 2.3 and objects 3.1 to 3.3 in an image sequence under test. Instead of or additionally to recognizing a multitude of characters and objects in one single frame and their respective positions relative to each other as depicted in FIG. 1, three characters 2.1 to 2.3 and three objects are identified in at least a fraction of the frames 1 from an image sequence. The arrows indicate a time interval in which the characters 2.1 to 2.3 and objects 3.1 to 3.3 respectively appear in the course of the image sequence. We refer to the pattern obtained this way as a time map. This time map can as well be compared to metadata from the database in order to identify if the image sequence under test at least partially equals to an image sequence described by a set of metadata. The positions of the faces 2.1 to 2.3 and objects 3.1 to 3.3 can as well be tracked over the course of the image sequence in order to further improve the method and increase its discriminatory power. The number of faces 2.1 to 2.3 and objects 3.1 to 3.3 recognized in the frames 1 of the image sequence can be different from three.

Figure 3:
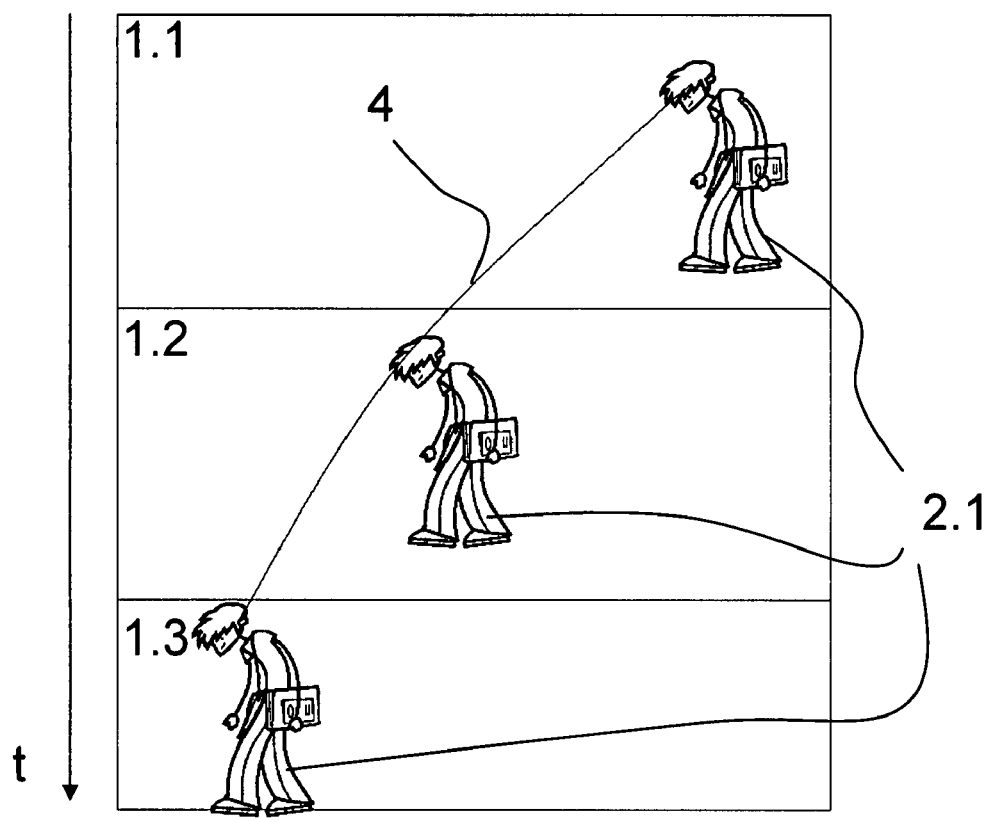
FIG. 3 shows three consecutive frames of an image sequence with a moving character.

FIG. 3 shows three consecutive frames 1.1 to 1.3 of an image sequence with a moving character 2.1. The character 2.1 is tracked in the course of the image sequence, i.e. his position in every frame 1.1 to 1.3 is determined. The result is a trajectory 4 in Minkowski space, which can also be compared to metadata in the database provided these metadata are appropriately structured. The frames 1.1 to 1.3 do not necessarily have to be directly consecutive. Instead the image sequence can be subsampled, e.g. every 10th frame 1 can be regarded. As well as the positions between objects 3.1 to 3.3 and characters 2.1 to 2.3 time intervals between their appearance can be described relative to each other thus avoiding scale dependences occurring along with subsampling or supersampling.

Figure 4:
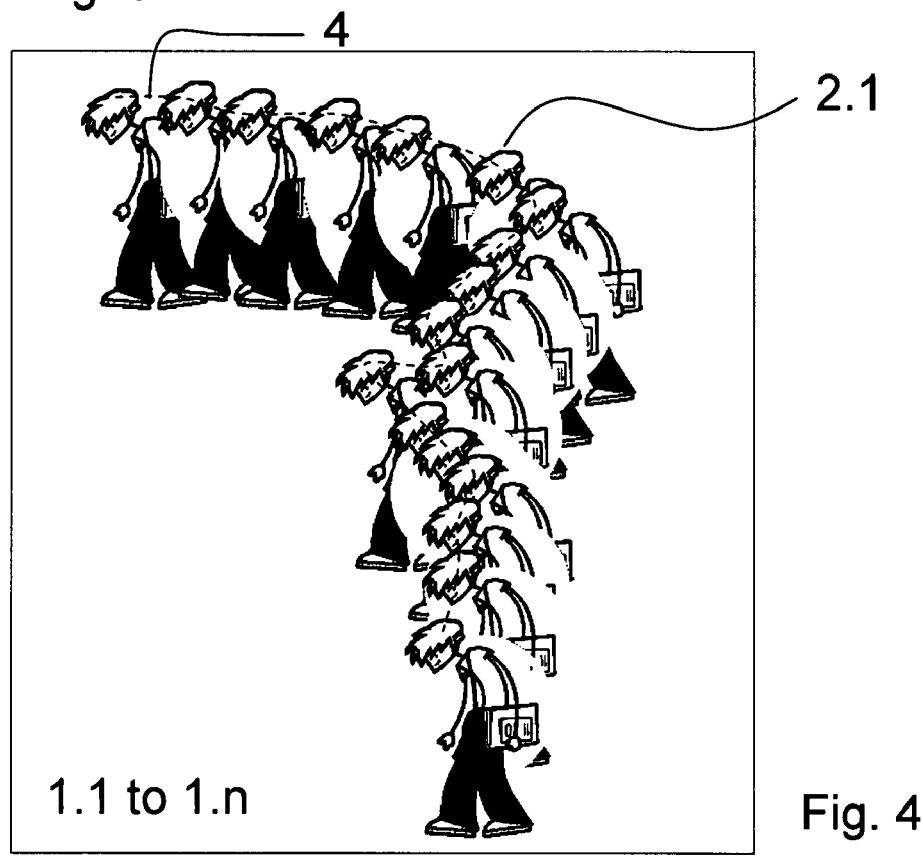
FIG. 4 depicts a track of a character in an image sequence.

FIG. 4 depicts a track of the character 2.1 from FIG. 3 in an image sequence. Basically FIG. 4 is another representation of the situation shown in FIG. 3. All frames 1.1 to 1.n are projected on top of each other thus allowing to see the track or trajectory 4 of character 2.1 in the course of the image sequence. Objects can be tracked the same way as characters 2.1 to 2.n. Optionally a probability map of the positions of characters 2.1 to 2.3 or objects 3.1 to 3.3 in at least a fraction of the image sequence can be created this way, which may be compared to metadata in the database as an additional feature.

Figure 5:
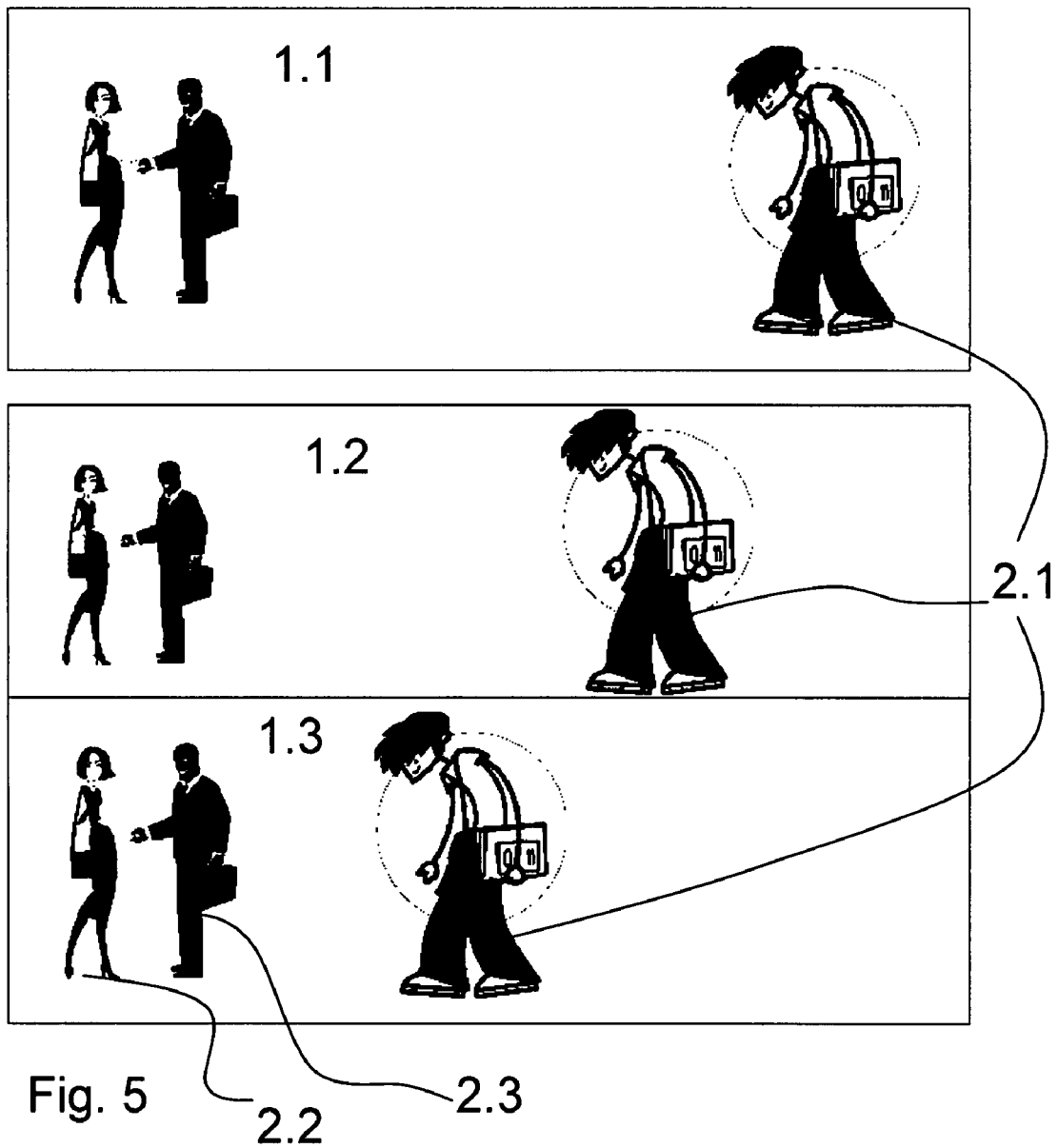
FIG. 5 is a track of three characters in the course of three frames of an image sequence.

FIG. 5 shows a track of three characters 2.1 to 2.3 in the course of three frames 1.1 to 1.3 of an image sequence. In this figure three characters 2.1 to 2.3 are tracked similar to what is shown in FIGS. 3 and 4. Regarding the tracks or trajectories 4 of more than one character 2.1 to 2.n and/or objects 3.1 to 3.n yields an even higher discriminatory power thus facilitating a unambiguous recognition of the image sequence under test. In the example the characters 2.2 and 2.3 are grouped and can be considered an object class of their own, for instance called crew.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for recognizing content in image sequence having at least one image frame, the method comprising the steps of:
   detecting at least one face appearing in at least one of the image frames of an image sequence under test;
   detecting and recognizing two or more characteristic features of the at least one face;
   comparing the characteristic features to known features of characters stored in a database for determining whether the face represents a known character;
   detecting and recognizing at least one additional feature in at least one frame of the image sequence under test, wherein the at least one additional feature comprises a feature movable independently of the at least one face;
   detecting and recognizing at least one spatial relation between the determined known character and the at least one additional feature;
   comparing the at least one spatial relation to metadata comprising known spatial relations stored in the database each one assigned to a particular known image sequence for recognizing if the image sequence under test at least partially equals one of the known image sequences;
   detecting and recognizing two or more characters in different frames;
   detecting an appearance of the two or more characters; and
   detecting and recognizing at least one spatiotemporal relation between the appearance of the two or more characters.

2. The method according to claim 1, wherein the relation is spatiotemporal.

3. The method according to claim 1, wherein the at least one character is a real person.

4. The method according to claim 1, wherein the at least one character is an animated character.

5. The method according to claim 1, wherein the at least one additional feature is another face.

6. The method according to claim 1, wherein the at least one additional feature is an object.

7. The method according to claim 6, wherein the object is a car, weapon, building, text, logo, and/or trademark.

8. The method according to claim 7, wherein the text object is identified by pattern matching.

9. The method according to claim 1, wherein the at least one additional feature includes a color of an object.

10. The method according to claim 1, wherein the at least one additional feature is an object touched by the known character.

11. The method according to claim 1, wherein the at least one additional feature is a costume worn by the known character.

12. The method according to claim 1, wherein the at least one additional feature is background scenery.

13. The method according to claim 1, wherein the at least one additional feature is sound.

14. The method according to claim 13, wherein the sound is verbal.

15. The method according to claim 13, wherein the sound is nonverbal.

16. The method according to claim 1, wherein the at least one additional feature is at least detected in the at least one frame in which the at least one face was detected.

17. The method according to claim 1, wherein the at least one additional feature is a spatiotemporal profile of the known character acquired by tracking the known character in the course of the image sequence under test.

18. The method according to claim 1, wherein co-appearance of at least two characters in the at least one frame is detected and compared to the metadata.

19. The method according to claim 1, wherein successive appearance of at least two characters in the image sequence under test along with time intervals between the appearances is detected and compared to the metadata.

20. The method according to claim 1, wherein the image sequence under test is subsampled, thereby reducing the number of frames to be tested.

21. The method according to claim 1, wherein a cast list of the image sequence under test is generated by recognizing characters.

22. The method according to claim 3, wherein the at least one additional feature is an object and wherein at least one of the additional features is a spatiotemporal profile of the known character acquired by tracking the known character in the course of the image sequence under test.

23. The method according to claim 1, further comprising detecting whether the image sequence under test is copyrighted by comparing it to metadata of an image sequence known to be copyrighted.

24. The method according to claim 23, wherein the detection is carried out on a server following an upload of the image sequence under test from a client computer wherein the image sequence under test is incorporated in a video database only if the image sequence under test is recognized as noncopyrighted.

25. The method according to claim 1, wherein, for detecting whether the image sequence, under test is part of a video output of a computer game, the image sequence is compared to metadata of the computer game.

26. An apparatus configured to perform the method according to claim 1, wherein the apparatus comprises at least one of a computer, a portable device, a video game console, a handheld devices or a cellular phone.

27. A method for recognizing content in image sequence having at least one image frame, the method comprising the steps of:
- detecting at least one face appearing in at least one of the image frames of an image sequence under test;
- detecting and recognizing two or more characteristic features of the at least one face;
- comparing the characteristic features to known features of characters stored in a database for determining whether the face represents a known character;
- detecting and recognizing at least one additional feature in at least one frame of the image sequence under test;
- detecting and recognizing at least one relation between the determined known character and the at least one additional feature; and
- comparing the at least one relation to metadata comprising known relations stored in the database each one assigned to a particular known image sequence for recognizing if the image sequence under test at least partially equals one of the known image sequences,
- wherein the detecting at least one face is carried out on a client computer following an attempt to upload the image sequence under test to a server and wherein the upload is denied if the image sequence under test is recognized as copyrighted,
- detecting and recognizing two or more characters in different frames;
- detecting an appearance of the two or more characters; and
- detecting and recognizing at least one spatiotemporal relation between the appearance of the two or more characters.

28. A method for recognizing content in an image sequence having at least one image frame, the method comprising the steps of:
- detecting at least one face appearing in at least one of the frames of an image sequence under test;
- detecting and recognizing two or more characteristic features of the at least one face;
- storing the characteristic features in a database and assigning them to a known character;
- detecting and recognizing at least one additional feature in at least one frame of the image sequence under test, wherein the at least one additional feature comprises a feature movable independently of the at least one face;
- detecting and recognizing at least one spatial relation between the determined known character and the at least one additional feature;
- storing the at least one spatial relation to metadata in the database; and
- assigning the at least one spatial relation to the image sequence under test in the database;
- detecting and recognizing two or more characters in different frames;
- detecting an appearance of the two or more characters; and
- detecting and recognizing at least one spatiotemporal relation between the appearance of the two or more characters.

29. A method for recognizing content in image sequence having at least one image frame, the method comprising the steps of:
- detecting at least one face appearing in at least one of the image frames of an image sequence under test;
- detecting and recognizing two or more characteristic features of the at least one face;
- comparing the characteristic features to known features of characters stored in a database for determining whether the face represents a known character;
- detecting and recognizing at least one additional feature in at least one frame of the image sequence under test, wherein the at least one additional feature comprises a body configuration;
- detecting and recognizing and at least one spatial relation between the determined known character and the at least one additional feature;
- comparing the at least one spatial relation to metadata comprising known spatial relations stored in the database each one assigned to a particular known image sequence for recognizing if the image sequence under test at least partially equals one of the known image sequences;
- detecting and recognizing two or more characters in different frames;
- detecting an appearance of the two or more characters; and
- detecting and recognizing at least one spatiotemporal relation between the appearance of the two or more characters.

30. The method according to claim 29, wherein the at least one additional feature is a facial expression of the known character.

31. The method according to claim 29, wherein the at least one additional feature is a hand gesture of the known character.

32. The method according to claim 29, wherein the at least one additional feature is a body position of the known character.

33. The method according to claim 29, wherein the at least one additional feature is a position of lips of the known character.

* * * * *